(12) United States Patent
Takada

(10) Patent No.: US 12,505,509 B2
(45) Date of Patent: Dec. 23, 2025

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Yosuke Takada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 654 days.

(21) Appl. No.: 17/933,816

(22) Filed: Sep. 20, 2022

(65) Prior Publication Data

US 2023/0095184 A1    Mar. 30, 2023

(30) Foreign Application Priority Data

Sep. 27, 2021  (JP) ................ 2021-156591

(51) Int. Cl.
*G06T 5/20*   (2006.01)
*G06T 5/60*   (2024.01)
(Continued)

(52) U.S. Cl.
CPC .......... *G06T 5/20* (2013.01); *G06T 5/60* (2024.01); *G06T 5/94* (2024.01); *G06T 7/11* (2017.01);
(Continued)

(58) Field of Classification Search
CPC ...... H04N 19/17; H04N 19/162; H04N 25/60; G06T 5/70; G06T 5/50; G06T 2207/10024; G06T 5/20; G06T 5/73; G06T 5/92; G06T 5/94; G06T 2207/20021; G06T 2207/20081; G06T 7/11; G06T 5/60; G06T 2207/20084; G06T 2207/20104;
(Continued)

(56) References Cited

U.S. PATENT DOCUMENTS 5,463,698 A * 10/1995 Meyer .............. G06T 5/20
                                                382/302
7,587,099 B2 * 9/2009 Szeliski ............ G06T 5/70
                                                348/241
(Continued)

FOREIGN PATENT DOCUMENTS

CN       104902143 B  *  1/2018
CN       110383332 A     10/2019
(Continued)

OTHER PUBLICATIONS

Uchida, Kazutaka, Masayuki Tanaka, and Masatoshi Okutomi. "Estimation and restoration of compositional degradation using convolutional neural networks." arXiv preprint arXiv:1812.09629 (2018). (Year: 2018).*

(Continued)

*Primary Examiner* — Courtney Joan Nelson
(74) *Attorney, Agent, or Firm* — Canon U.S.A., Inc. IP Division

(57) ABSTRACT

An information processing apparatus includes an identification unit configured to identify a partial region of an input image, and a processing unit configured to perform image processing for reducing degradation of the input image on the input image by inference using a neural network. The processing unit is configured to change the image processing between the partial region and another region.

22 Claims, 8 Drawing Sheets

(51) Int. Cl.
*G06T 5/94* (2024.01)
*G06T 7/11* (2017.01)

(52) U.S. Cl.
CPC ............ *G06T 2207/20081* (2013.01); *G06T 2207/20084* (2013.01); *G06T 2207/20104* (2013.01)

(58) Field of Classification Search
CPC ...... G06V 10/25; G06V 10/147; G06V 10/30; G06V 10/54; G06V 10/82; G06V 30/164; G06N 3/045; G06N 3/0464; G06N 3/08; G06N 3/09; G06F 18/214
See application file for complete search history.

(56) References Cited

U.S. PATENT DOCUMENTS

| | | | |
|---|---|---|---|
| 7,590,306 B2 * | 9/2009 | Lal | G06T 5/70 382/298 |
| 9,002,131 B2 * | 4/2015 | Rao | G06T 5/73 382/218 |
| 10,789,696 B2 * | 9/2020 | Po | G06N 3/045 |
| 2020/0065940 A1 * | 2/2020 | Tang | G06F 18/214 |
| 2020/0380641 A1 * | 12/2020 | Higaki | G06N 3/045 |

FOREIGN PATENT DOCUMENTS

| | | | | |
|---|---|---|---|---|
| CN | 110770784 A | | 2/2020 | |
| CN | 106952652 B * | | 6/2020 | ............ H04W 4/025 |
| JP | 2010147660 A | | 7/2010 | |
| JP | 2018185724 A | | 11/2018 | |
| JP | 2020184300 A | | 11/2020 | |
| WO | WO-2017080236 A1 * | | 5/2017 | ............ H04N 23/73 |
| WO | 2020179065 A1 | | 9/2020 | |
| WO | 2021024402 A1 | | 2/2021 | |

OTHER PUBLICATIONS

A machine translation obtained from google patents of WO-2017080236-A1 (Year: 2017).*
A machine translation obtained from google patents of CN-106952652-B (Year: 2020).*
A machine translation obtained from google patents of CN-104902143-B (Year: 2018).*
Kazutaka Uchida et al., Non-blind Image Restoration Based on Convolutional Neural Network, arXiv:1809.03757v1 [cs.CV] Sep. 11, 2018, Tokyo, Japan.
Shi Guo, et al., Toward Convolutional Blind Denoising of Real Photographs, 2019 IEEE/CVF Conference on Computer Vision and Pattern Recognition (CVPR), 2019.
Kai Zhang, et al., FFDNet: Toward a Fast and Flexible Solution for CNN based Image Denoising, Institute of Electrical and Electronics Engineers (IEEE) Transactions on Image Processing, vol. 27, issue 9.

* cited by examiner

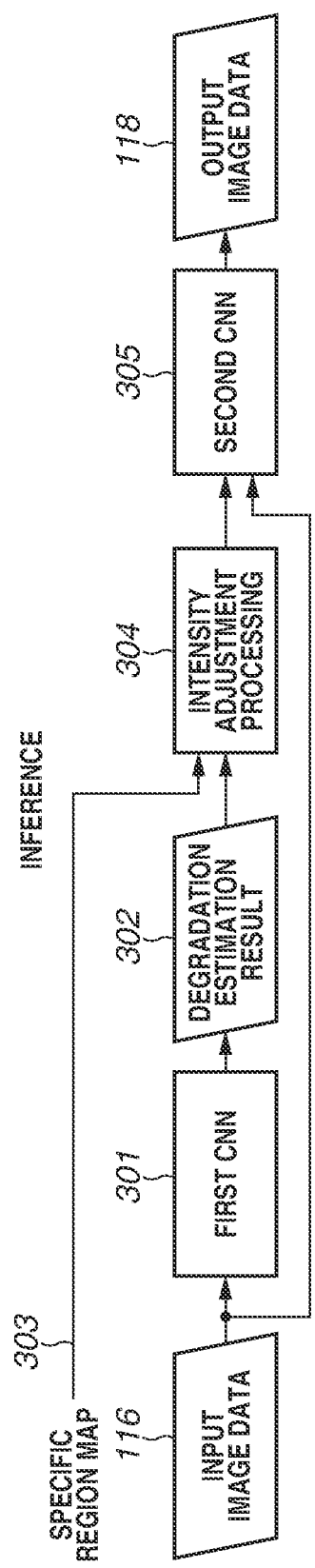
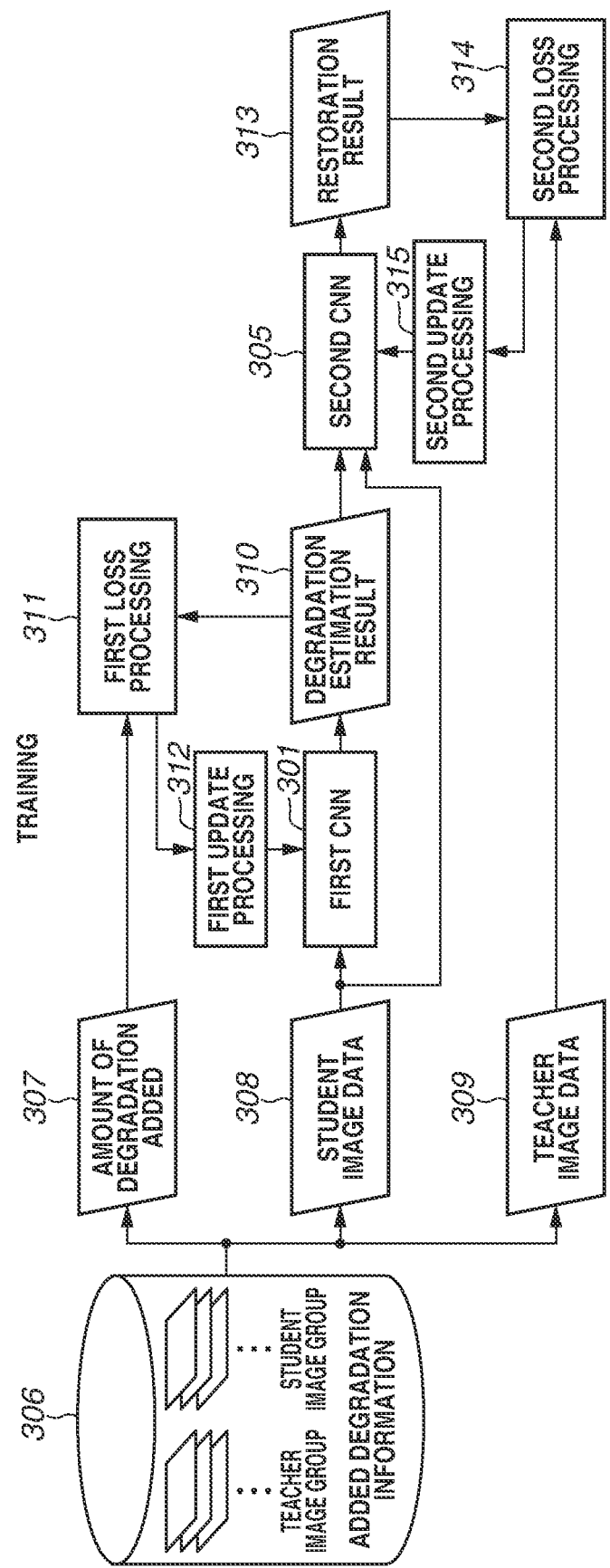
FIG.3A INFERENCE
FIG.3B TRAINING

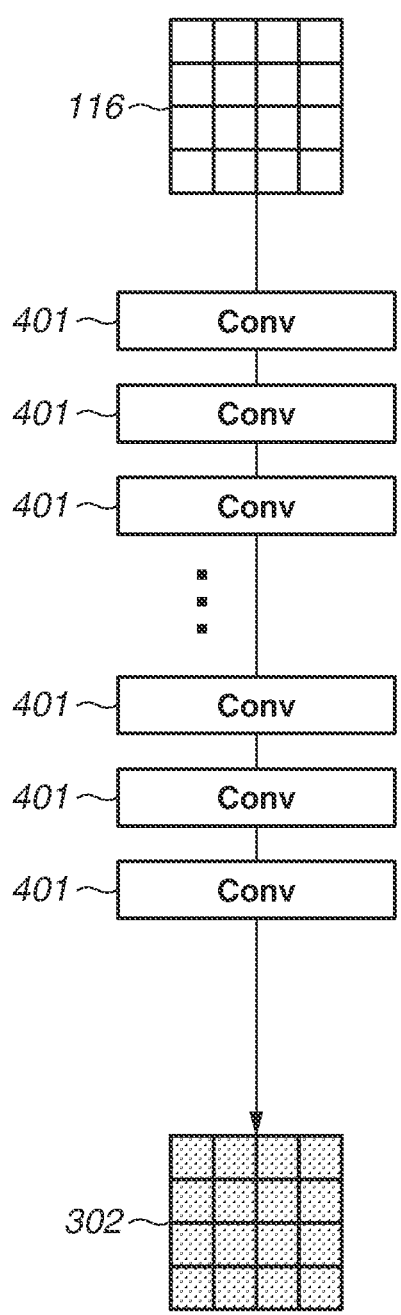
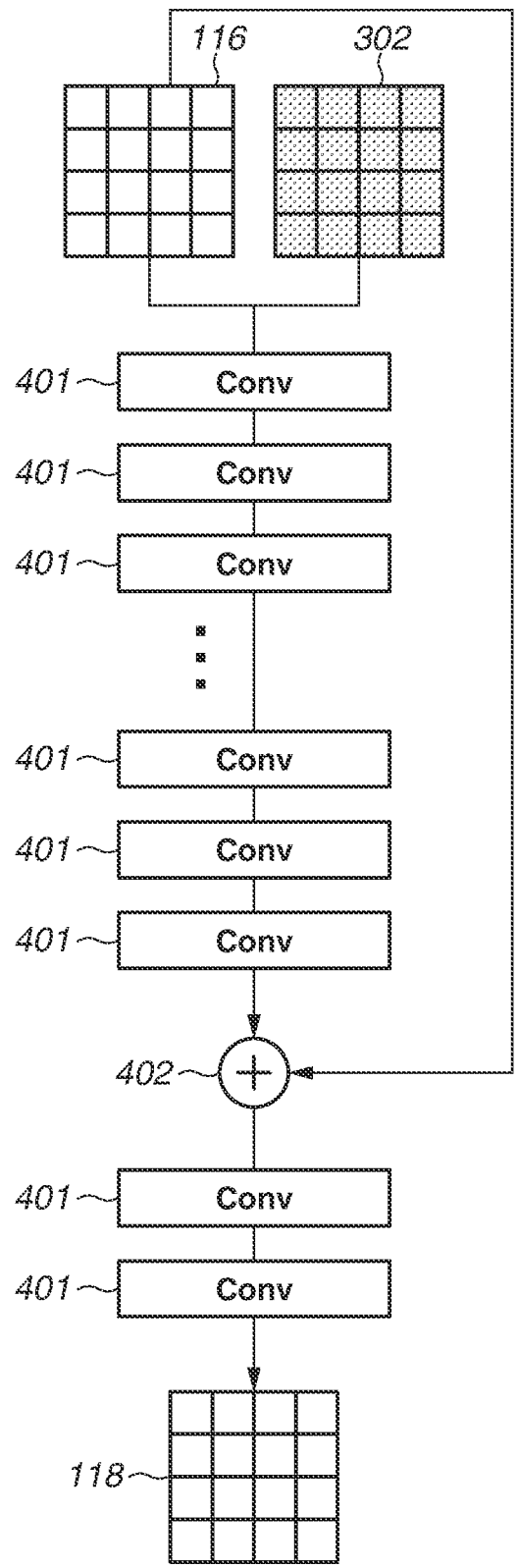

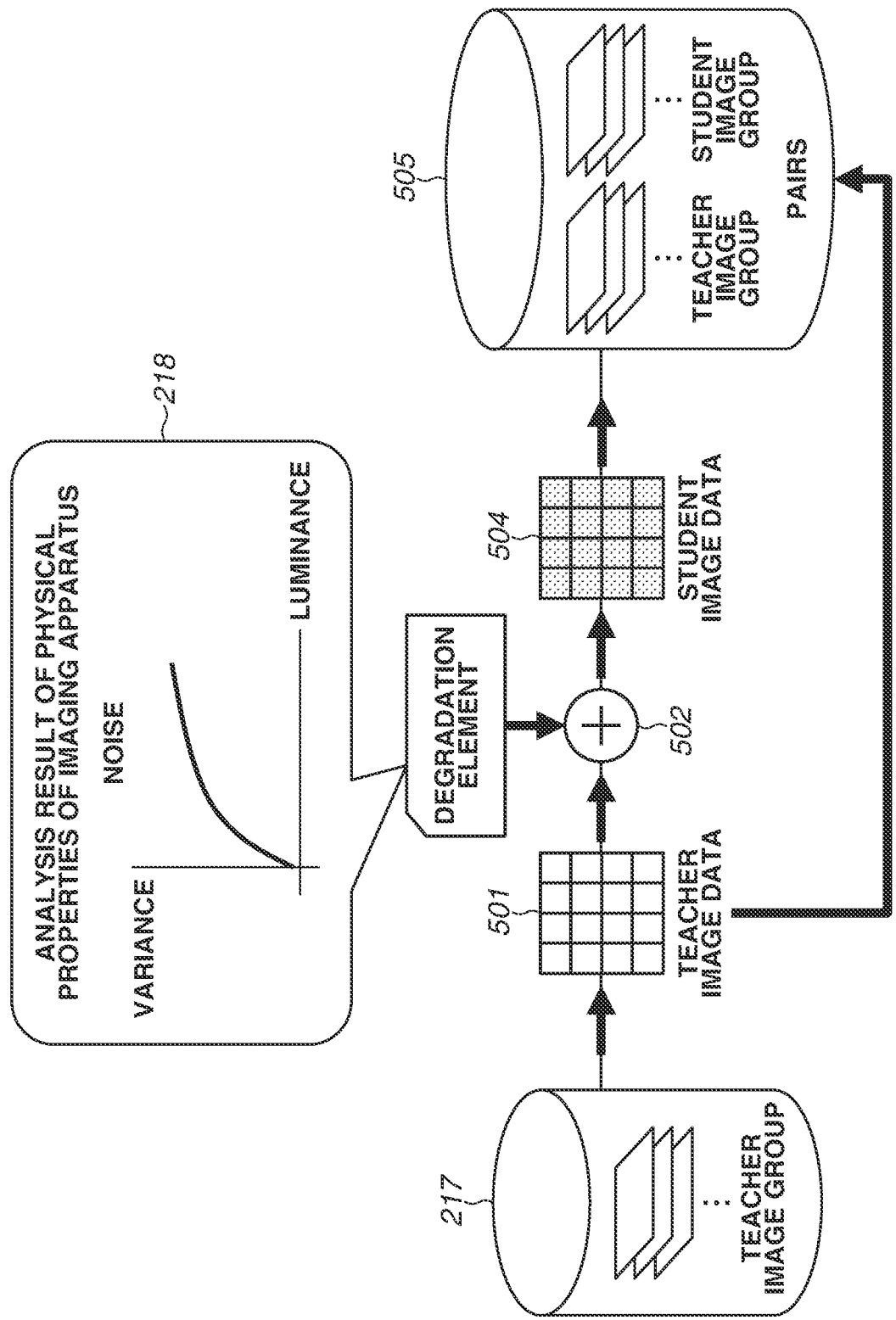

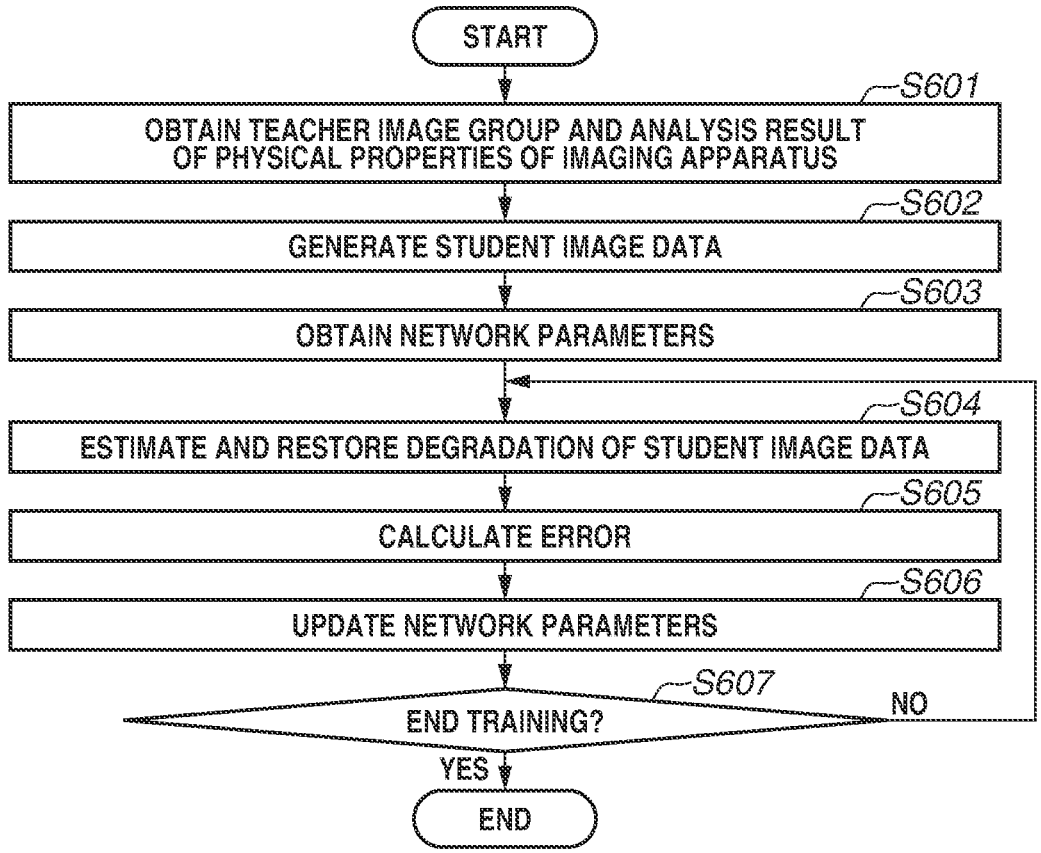
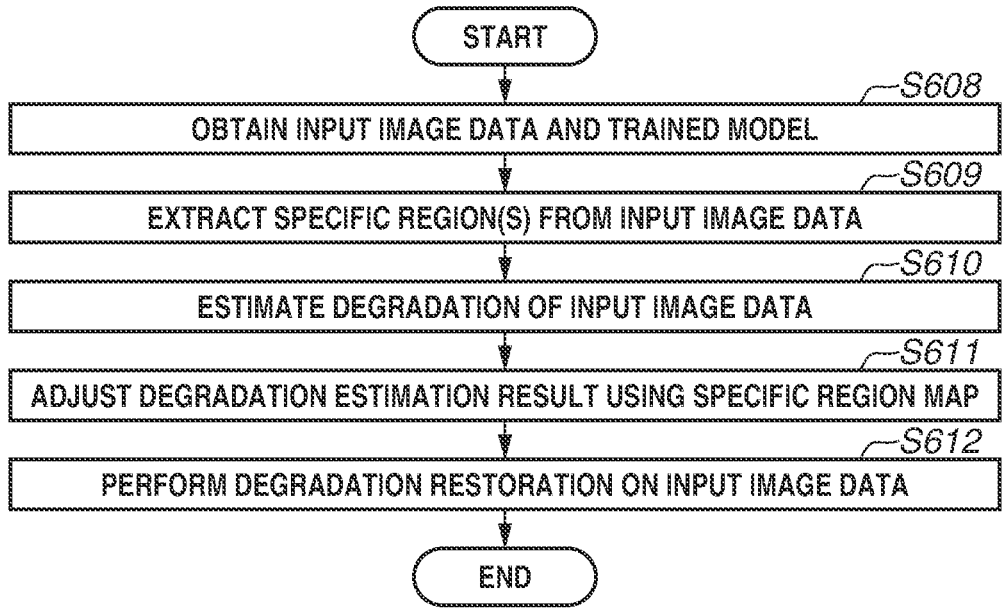

INFORMATION PROCESSING APPARATUS, INFORMATION PROCESSING METHOD, AND STORAGE MEDIUM

BACKGROUND

Field of the Disclosure

The present disclosure relates to an information processing technique for reducing image degradation.

Description of the Related Art

Deep neural networks (DNNs) have been applied to various information processing application programs in recent years. A DNN refers specifically to a neural network including two or more hidden layers, and its performance improves as the number of hidden layers increases. An example of information processing using a DNN is image processing for reducing image degradation. Degradation elements of an image include, for example, noise, blur, low resolution, and missing data. The processing for reducing image degradation may include noise reduction, deblurring, super-resolution, and missing data compensation.

Zhang, Kai; Zuo, Wangmeng; Zhang, Lei, "FFDNet: Toward A Fast AND Flexible Solution for CNN based Image Denoising", Institute of Electrical and Electronics Engineers (IEEE) Transactions on Image Processing, vol. 27, issue 9, pp. 4608-4622 (hereinafter, referred to as Non-Patent Literature 1) discusses a method for training a neural network using a plurality of images having different noise levels. Guo, Shi; Yan, Zifei; Zhang, Kai; Zuo, Wangmeng; Zhang, Lei, "Toward Convolutional Blind Denoising of Real Photographs", 2019 IEEE/Computer Vision Foundation (CVF) Conference on Computer Vision and Pattern Recognition (CVPR) (hereinafter, referred to as Non-Patent Literature 2) discusses a method for estimating noise in an actually captured image from Poisson distribution variance by information processing using a multilayer neural network, and obtaining a noise-reduced image based on the estimation result.

However, the methods discussed in the foregoing Non-Patent Literature 1 and Non-Patent Literature 2 are unable to favorably reduce degradation in each local partial region of an image to be processed separately.

SUMMARY

According to an aspect of the present disclosure, an information processing apparatus includes an identification unit configured to identify a partial region of an input image, and a processing unit configured to perform image processing for reducing degradation of the input image on the input image by inference using a neural network. The processing unit is configured to change the image processing between the partial region and another region.

Further features of the present disclosure will become apparent from the following description of exemplary embodiments with reference to the attached drawings.

BRIEF DESCRIPTION OF THE DRAWINGS

FIGS. 3A and 3B are diagrams for describing a procedure for inference and training.

FIGS. 4A and 4B are diagrams for describing a structure of a convolutional neural network (CNN) and a training procedure.

FIG. 5 is a diagram for describing degradation addition processing.

FIGS. 6A and 6B are flowcharts illustrating an information processing procedure according to one or more aspects of the present disclosure.

DESCRIPTION OF THE EMBODIMENTS

Figure 1:
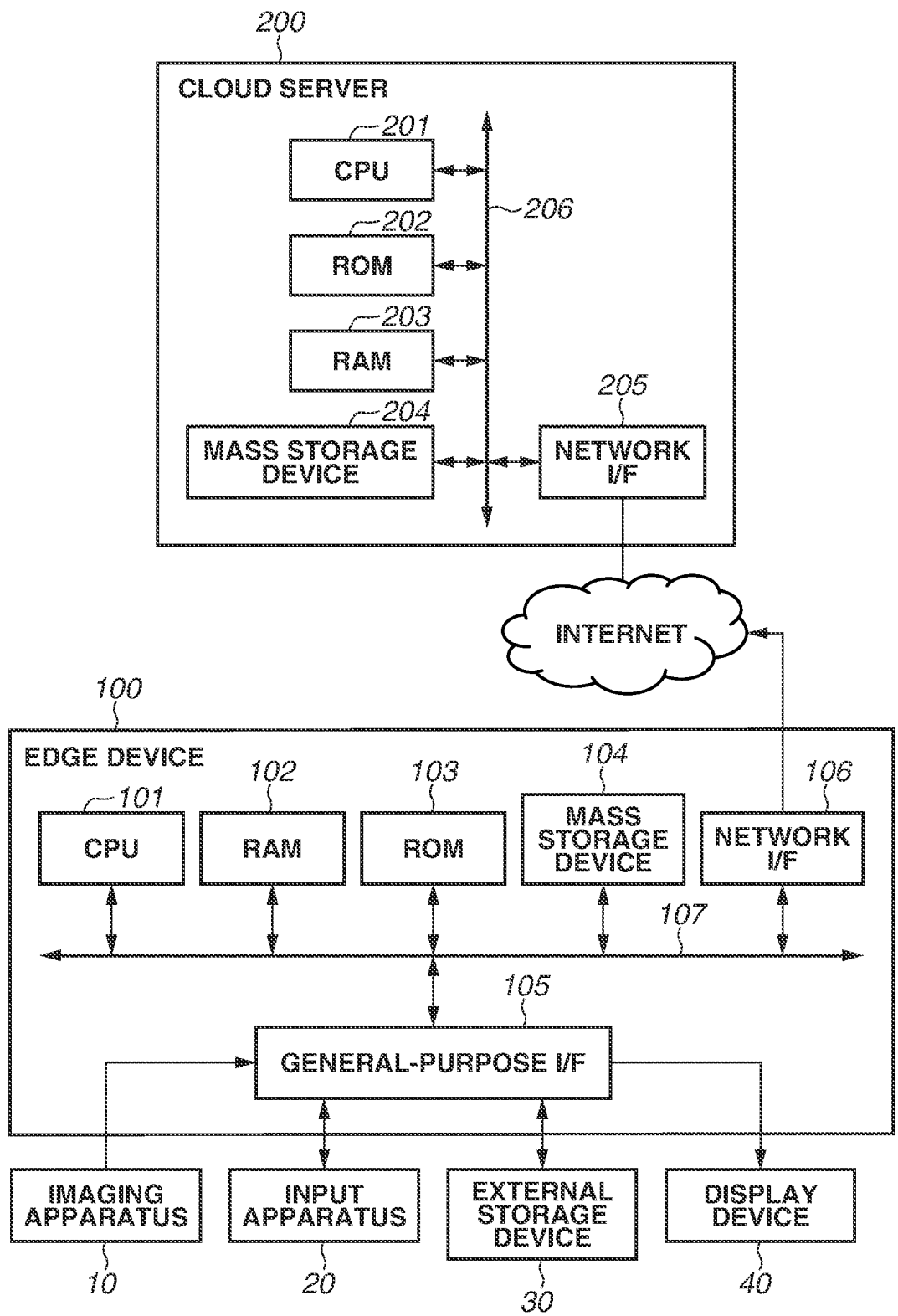
FIG. 1 is a diagram illustrating an example of a system configuration to which an information processing apparatus is applied.

Some exemplary embodiments will be described below with reference to the drawings. The following exemplary embodiments are not intended to limit the present disclosure, and not all combinations of the features described in the exemplary embodiments are used as the solving means of the present disclosure. The configurations of the exemplary embodiments can be modified or changed as appropriate depending on the specifications and various conditions (such as use condition and use environment) of the apparatuses to which the present disclosure is applied. Parts of the exemplary embodiments described below may be combined as appropriate. In the following description of the exemplary embodiments, like numbers will refer to likes components.

<About CNN>

A convolutional neural network (CNN) that is used in deep learning-based information processing techniques in general used in the following exemplary embodiments will initially be described. A CNN is a technique for performing convolution of a filter generated by training or learning on image data and nonlinear calculation repeatedly. Filters are also referred to as local receptive fields (LRFs). Image data obtained by the convolution of a filter on image data, followed by nonlinear calculation, is called a feature map. Training is performed using training data (training images or data sets) including pairs of input image data and output image data. Simply put, training refers to generating filter values capable of converting input image data into corresponding output image data with high precision from the training data. Details thereof will be described below.

If the image data includes red, green, and blue (RGB) color channels or if a feature map includes image data on a plurality of images, the filter to be used for convolution also includes a plurality of channels accordingly. More specifically, the convolution filter is expressed by a four-dimensional array including vertical and horizontal sizes, the number of images, and the number of channels. Processing for performing the convolution of a filter on image data (or feature map) and nonlinear calculation is expressed in units of layers, like an nth-layer feature map and an nth-layer filter. For example, a CNN that repeats filter convolution and nonlinear calculation three times has a three-layer network structure. Such nonlinear calculation processing can be formulated by the following Eq. (1):

$$X_n^{(l)} = f(\sum_{n=1}^{N} W_n^{(l)} * X_{n-1}^{(l)} + b_n^{(l)}) \quad \text{Eq. (1)}$$

In Eq. (1), $W_n$ is the nth-layer filter, $b_n$ is an nth-layer bias, f is a nonlinear operator, $X_n$ is the nth-layer feature map, and * is the convolution operator. (1) indicates that the filter or feature map is the lth one. The filters and biases are generated by training to be described below, and are referred to collectively as "network parameters". The nonlinear calculation uses a sigmoid function or a rectified linear unit (ReLU), for example. A ReLU is given by the following Eq. (2):

$$f(X) = \begin{cases} X & \text{if } 0 \le X \\ 0 & \text{otherwise} \end{cases}. \qquad \text{Eq. (2)}$$

As expressed by Eq. (2), negative components of the input vector X become zero, and positive components are maintained intact.

Among known CNN-based networks are Residual Network (ResNet) in the image recognition field and its application Residual Encoder-Decoder Network (RED-Net) in the super-resolution field. Both include a multilayer CNN to perform filter convolution many times for high-precision processing. For example, the ResNet is characterized by a network structure including a path for shortcutting convolution layers, whereby a multilayer network including as many as 152 layers is constructed to achieve high-precision recognition close to human's recognition rates.

The reason why a multilayer CNN increases processing precision is, simply put, that a nonlinear relationship between the input and output can be represented by repeating nonlinear calculation many times.

<CNN Training>

Next, CNN training will be described. A CNN is trained by minimizing an objective function with respect to training data including pairs of input training image (hereinafter, also referred to as student image) data and corresponding output training image (hereinafter, also referred to as teacher image) data. The objective function is typically expressed by the following Eq. (3):

$$L(\theta) = \frac{1}{n}\sum_{i=1}^{n} \|F(X_i; \theta) - Y_i\|_2^2. \qquad \text{Eq. (3)}$$

In Eq. (3), L is a loss function for measuring an error between a correct answer and its estimation. $Y_i$ is ith output training image data, and Xi is ith input training image data. F is a function collectively expressing the calculation performed in each layer of the CNN (Eq. (1)). θ is a network parameter (filter and bias). $\|Z\|_2$ is the L2 norm, or simply put, the root sum square of the components of a vector Z. n is the total number of pieces of training data used in training. Since the total number of pieces of training data is typically large, stochastic gradient descent (SGD) selects some of the pieces of training image data at random and uses the selected pieces for training. This can reduce calculation load for training using a lot of pieces of training data. There are known various methods for minimizing (optimizing) the objective function, including the momentum method, adaptive gradient (AdaGrad), AdaDelta, and adaptive moment estimation (Adam). Adam is given by the following Eqs. (4):

$$g = \frac{\partial L}{\partial \theta_i^t} \qquad \text{Eqs. (4)}$$

$$m = \beta_1 m + (1 - \beta_1)g$$

$$v = \beta_2 v + (1 - \beta_2)g^2$$

$$\theta_i^{t+1} = \theta_i^t - \alpha \frac{\sqrt{1-\beta_2^t}}{(1-\beta_1)} \frac{m}{(\sqrt{v} + \varepsilon)}.$$

In Eqs. (4), $\theta_i^t$ is the ith network parameter at the tth repetition, and g is the gradient of the loss function L for $\theta_i^t$. m and v are moment vectors, α is the base learning rate, $\beta_1$ and $\beta_2$ are hyper parameters, and ε is a small constant. Since there is no selection guideline on the optimization method for training, basically any method can be used. However, different methods have different convergence properties and are known to make a difference in training time.

In the present exemplary embodiment, information processing (image processing) for reducing image degradation is performed using the CNN mentioned above. Examples of degradation elements of an image include degradation such as noise, blur, aberration, compression, low resolution, and missing data, and degradation such as a drop in contrast due to the weather during imaging, including fog, mist, snow, and rain. Examples of the image processing for reducing image degradation may include noise reduction, deblurring, aberration correction, missing data compensation, correction of compression-based degradation, super-resolution processing on a low-resolution image, and processing for correcting a drop in contrast due to the weather during imaging. Image degradation reduction processing according to the present exemplary embodiment is processing for generating or restoring a degradation-free (or little degraded) image from a degraded image. In the following description, such image degradation reduction processing will be referred to as image restoration processing.

In other words, image restoration according to the present exemplary embodiment covers the case of enabling a reduction in degradation included in the original image itself, as well as the case of restoring an image that is degradation-free (little degraded) itself and subsequently degraded by amplification, compression, decompression, or other image processing.

For image degradation that can be expressed by a specific parameter or parameters, image restoration processing using a neural network can provide image restoration performance surpassing that of conventional processing not using a neural network. However, the image restoration performance of a single neural network can be insufficient if there are various types of image degradation. For example, in the case of noise reduction, a neural network trained using images with a single noise level or a sufficiently narrow range of noise levels can provide a sufficient noise reduction effect if the target image of the image restoration processing has a noise level similar to in the training. On the other hand, if the target image of the image restoration processing has a noise level different from that of the images used in training, the neural network can provide an insufficient noise reduction effect. The foregoing Non-Patent Literature 1 discusses a method for training a neural network using a plurality of images of different noise levels so that the single neural network can handle a plurality of images of different noise levels. According to the method discussed in Non-Patent Literature 1, a sufficient noise reduction effect can be obtained if the target image of the image restoration processing has a noise level similar to that of one of the images used in training. However, as described above, the methods discussed in Non-Patent Literature 1 and Non-Patent Literature 2 are unable to favorably reduce degradation in local partial regions of the target image of the image restoration processing.

A first exemplary embodiment deals with a method for estimating the intensity of image quality degradation in an input image and adjusting the intensity of restoration in each local region of the input image based on the estimation result so that the degradation can be reduced region by region of the image to be processed, without changing the configuration of the neural network. The intensity of restoration refers to the amount of reduction in degradation in the degradation reduction processing, i.e., the amount of restoration in the image restoration processing. The present exemplary embodiment will be described below by using noise as an example of a degradation element of an image, using an example where noise reduction processing is performs as the image restoration processing.

Configuration Example of Information Processing System

FIG. 1 is a diagram illustrating an example of a system configuration to which an information processing apparatus according to the first exemplary embodiment is applied. The information processing apparatus illustrated in FIG. 1 includes a cloud server 200 and an edge device 100 connected via the Internet. The cloud server 200 is in charge of generating training data, estimating image quality degradation, and doing training for restoration. The edge device 100 is in charge of degradation restoration on an image to be processed. The generation of training data, the estimation of image quality degradation, and the training for restoration by the cloud server 200 will hereinafter be referred to as degradation restoration training. The degradation restoration by the edge device 100 will be referred to as degradation restoration inference.

<Hardware Configuration of Edge Device>

The edge device 100 according to the present exemplary embodiment obtains raw image data (Bayer arrangement) input from an imaging apparatus 10 as an input image to perform the image restoration processing on. The edge device 100 then performs degradation restoration inference on the input image to be processed by applying trained network parameters provided by the cloud server 200. In other words, the edge device 100 is an information processing apparatus that reduces noise in raw image data by using neural networks provided by the cloud server 200 and running an information processing application program installed in advance. The edge device 100 includes a central processing unit (CPU) 101, a random access memory (RAM) 102, a read-only memory (ROM) 103, a mass storage device 104, a general-purpose interface (I/F) 105, and a network I/F 106. These components are connected to one another by a system bus 107. The edge device 100 is also connected to the imaging apparatus 10, an input apparatus 20, an external storage device 30, and a display device 40 via the general-purpose I/F 105.

The CPU 101 runs programs stored in the ROM 103 using the RAM 102 as a work memory, and controls the components of the edge device 100 via the system bus 107 in a centralized manner. The mass storage device 104 is a hard disk drive (HDD) or a solid-state drive (SSD), for example, and stores various types of data and image data to be handled by the edge device 100. The CPU 101 writes data to the mass storage device 104 and reads data stored in the mass storage device 104 via the system bus 107. The general-purpose I/F 105 is a serial bus I/F such as a Universal Serial Bus (USB), Institute of Electrical and Electronics Engineers (IEEE) 1394, and High-Definition Multimedia Interface (HDMI)® I/Fs. The edge device 100 obtains data from the external storage device 30 (various storage media such as a memory card, a CompactFlash (CF) card, a Secure Digital (SD) card, and a USB memory) via the general-purpose I/F 105. The edge device 100 also accepts user instructions from the input apparatus 20, such as a mouse and a keyboard, via the general-purpose I/F 105. The edge device 100 outputs image data processed by the CPU 101 to the display device 40 (various image display devices such as a liquid crystal display) via the general-purpose I/F 105. The edge device 100 obtains data on a captured image (raw image) to perform the noise reduction processing on from the imaging apparatus 10 via the general-purpose I/F 105. The network I/F 106 is an I/F for connecting to the Internet. The edge device 100 accesses the cloud server 200 using an installed web browser, and obtains network parameters for degradation restoration inference.

<Hardware Configuration of Cloud Server>

The cloud server 200 according to the present exemplary embodiment is an information processing apparatus that provides cloud services on the Internet. More specifically, the cloud server 200 generates training data, performs degradation restoration training, and generates a trained model storing network parameters resulting from the training and network structures. The cloud server 200 then provides the trained model in response to a request from the edge device 100. The cloud server 200 includes a CPU 201, a ROM 202, a RAM 203, a mass storage device 204, and a network I/F 205. These components are connected to one another by a system bus 206. The CPU 201 controls operation of the entire cloud server 200 by reading control programs stored in the ROM 202 and performing various types of processing. The RAM 203 is used as a temporary storage area such as a main memory and a work area of the CPU 201. The mass storage device 204 is a large-capacity secondary storage device such as an HDD and an SSD, and stores image data and various programs. The network I/F 205 is an I/F for connecting to the Internet. The network I/F 205 provides the trained model storing the foregoing network parameters and network structures in response to a request from the web browser on the edge device 100.

While the edge device 100 and the cloud server 200 also include other components than the foregoing, a description thereof will be omitted here. In the present exemplary embodiment, the trained model obtained by the cloud server 200 generating the training data and performing the degradation restoration training is assumed to be downloaded to the edge device 100, and the edge device 100 to perform degradation restoration inference on the input image data to be processed. Such a system configuration is just an example and not restrictive. For example, the functions of the cloud server 200 may be subdivided and the generation of the training data and the degradation restoration training may be performed by separate apparatuses. The imaging apparatus 10 may be configured to have both the functions of the edge device 100 and those of the cloud servers 200, and perform all the generation of the training data, the degradation restoration training, and the degradation restoration inference.

<Functional Blocks of Entire Information Processing System>

Next, a functional configuration of the entire information processing system according to the present exemplary embodiment will be described with reference to FIG. 2.

Figure 2:
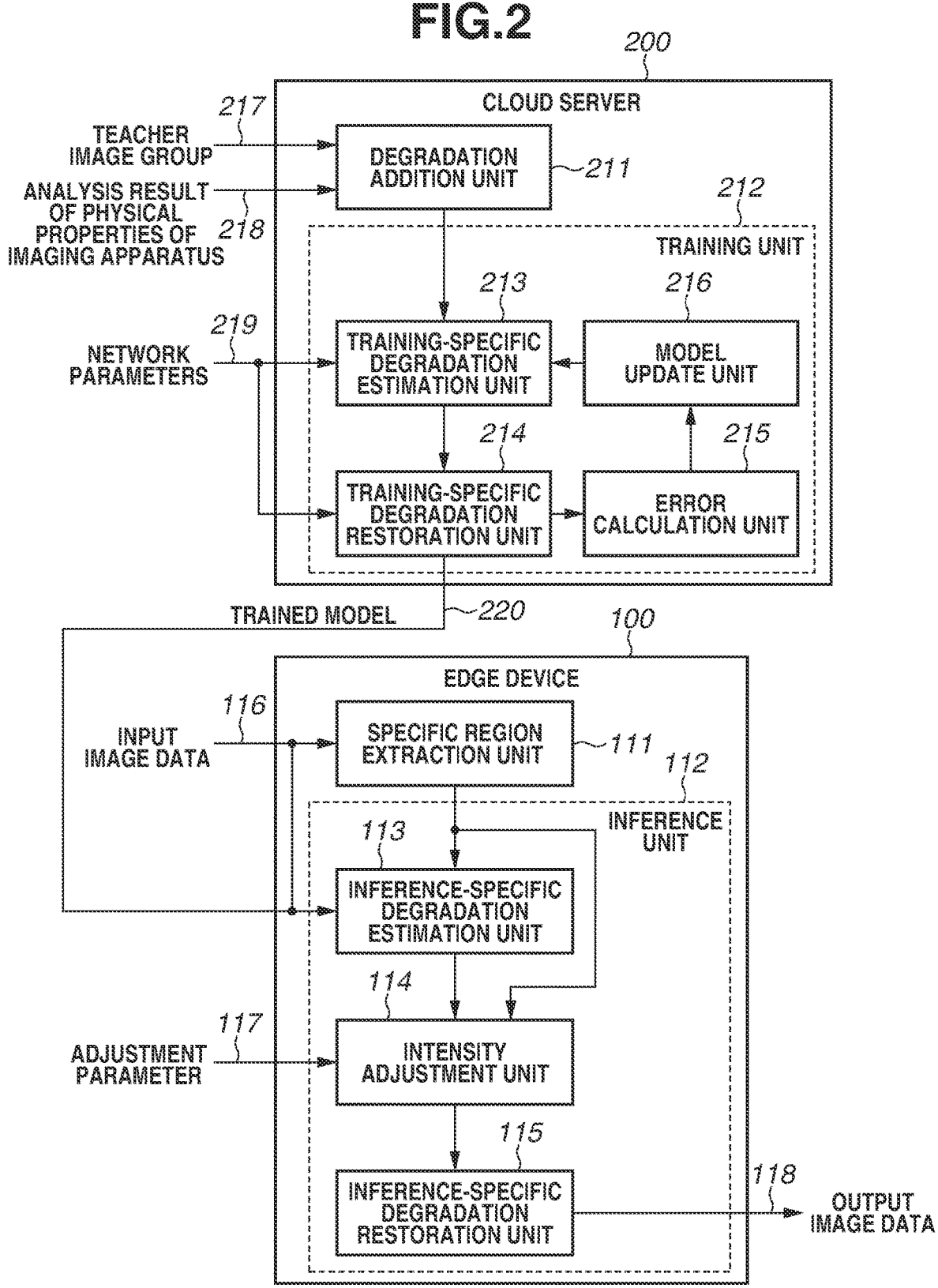
FIG. 2 is a diagram illustrating a functional configuration of an entire information processing system according to one or more aspects of the present disclosure.

As illustrated in FIG. 2, the edge device 100 includes a specific region extraction unit 111 and an inference unit 112. As will be described in detail below, the inference unit 112 has the function of image restoration processing for reducing image degradation. The inference unit 112 includes an inference-specific degradation estimation unit 113, an intensity adjustment unit 114, and an inference-specific degradation restoration unit 115. In other words, the inference unit 112 includes two neural networks, namely, a degradation inference network including the inference-specific degradation estimation unit 113 and a degradation restoration network including the inference-specific degradation restoration unit 115.

The cloud server 200 includes a degradation addition unit 211 and a training unit 212. As will be described in detail below, the training unit 212 has a degradation estimation function of estimating degradation of a student image using a teacher image and the student image, and a degradation restoration function of performing image restoration processing on the student image based on the result of the degradation estimation. The training unit 212 includes a training-specific degradation estimation unit 213, a training-specific degradation restoration unit 214, an error calculation unit 215, and a model update unit 216. In other words, the training unit 212 includes two neural networks, namely, a degradation estimation network including the training-specific degradation estimation unit 213 and a degradation restoration network including the training-specific degradation restoration unit 214.

The configuration illustrated in FIG. 2 can be modified or changed as appropriate. For example, one functional unit may be divided into a plurality of functional units. Two or more functional units may be integrated into one. The configuration illustrated in FIG. 2 may be implemented by two or more apparatuses.

In such a case, the apparatuses are connected via a circuit or a wired or wireless network, and perform the processes according to the present exemplary embodiment by performing data communication with each other for cooperative operation.

The functional units of the edge device 100 will initially be described.

The specific region extraction unit 111 obtains input image data 116, and extracts local partial regions from the input image data 116 (input image). In the present exemplary embodiment, the local partial regions of the input image will hereinafter be referred to as specific regions. The specific region extraction unit 111 then outputs a specific region map indicating the extraction result of the specific regions. In the present exemplary embodiment, raw image data where each pixel has a pixel value corresponding to the R, G, or B color is used as the input image data 116. The raw image data is image data captured using a color filter of Bayer arrangement where each pixel has information about one color.

In the present exemplary embodiment, a specific region may be the region of a main object or a specific object included in the input image data 116, or the region of a different object. There may be one main object to extract a specific region of, or a plurality of main objects. There may be one different object to extract a specific region of than a main object, or a plurality of such objects. Which of the regions of such main and other objects to extract as a specific region may be determined in advance or freely selected by the user, for example. Specific regions are not limited to regions inside the image like that of an object. For example, components within a specific frequency band included in the image can be extracted as specific regions. As an example, components within a specific frequency band such as a high frequency band detected using an edge detection filer, like a Sobel filter and a Laplacian filter, may be extracted as specific regions. Undetected components in a lower frequency band may be extracted as specific regions. Both the regions of specific objects or main objects (or the other regions) and components within a specific frequency band (or the other frequency bands) may be extracted as specific regions. Which regions to extract may be selectively switched as appropriate. The methods for extracting specific regions are not limited thereto, and a method for extracting a region freely specified by the user in the input image as a specific region may be used as well. The user-specified specific region may be the region of a main object or a specific object, or a different region. The user-specified specific region may be a region including components within a specific frequency band or one including components in the other frequency bands.

The inference unit 112 estimates degradation of the input image data 116 using a trained model 220 received from the cloud server 200, and performs degradation restoration inference based on the estimation result.

In the present exemplary embodiment, the inference unit 112 reduces degradation (performs degradation restoration) while controlling the amount of restoration by restoration processing in the specific region(s) and the other regions separately. As employed herein, the amount of restoration refers to an amount by which the intensity of degradation restoration is adjusted in each of the specific region(s) and the other regions, i.e., the amount of reduction in degradation by the degradation reduction processing. In the present exemplary embodiment, the degradation restoration inference is performed by the inference-specific degradation estimation unit 113, the intensity adjustment unit 114, and the inference-specific degradation restoration unit 115.

The inference-specific degradation estimation unit 113 obtains the input image data 116, and estimates the amount of degradation indicating the degree of degradation of the input image data 116 using the trained model 220. The amount of degradation is estimated using a neural network. FIG. 3A is a diagram illustrating a processing procedure for the inference unit 112. As illustrated in FIG. 3A, the inference-specific degradation estimation unit 113 inputs the input image data 116 into a first CNN 301 to repeat the convolution calculation and the nonlinear calculation expressed by Eqs. (1) and (2) a plurality of times, and outputs a degradation estimation result 302 that is the estimation result of image degradation.

FIGS. 4A and 4B are diagrams for describing the structure of CNNs and a procedure for inference and training.

The processing by the first CNN 301 will initially be described with reference to FIGS. 3A and 4A.

The first CNN 301 includes a plurality of filters 401 for preforming the calculation of the foregoing Eq. (1). The inference-specific degradation estimation unit 113 initially inputs the input image data 116 into this CNN. The inference-specific degradation estimation unit 113 then sequentially applies the filters 401 to the input image data 116 to calculate a feature map (not illustrated). The inference-specific degradation estimation unit 113 outputs the result of application of the last filter 401 as the degradation estimation result 302. The degradation estimation result 302 has the same channels as those of the input image data 116.

The intensity adjustment unit 114 processes the degradation estimation result 302 estimated by the inference-specific degradation estimation unit 113, using a specific region map 303 provided by the specific region extraction unit 111. In the present exemplary embodiment, the processing of the degradation estimation result refers to intensity adjustment processing for adjusting the amount of estimation of degradation pixel by pixel in the specific region(s) included in the degradation estimation result 302. As intensity adjustment processing 304, the intensity adjustment unit 114 adjusts the amount of estimation of degradation by multiplying the specific region(s) in the degradation estimation result 302 by a coefficient α 117 pixel by pixel. If α>1, the amount of restoration of the input image data 116 increases. If α<1, the amount of restoration decreases.

Next, the inference-specific degradation restoration unit 115 receives the degradation estimation result 302 processed by the intensity adjustment unit 114, and performs restoration processing on the degradation of the input image data 116 based on the processed degradation estimation result 302. In other words, the inference-specific degradation restoration unit 115 performs the restoration processing on the degradation of the input image data 116 by controlling the amount of reduction in degradation based on the amount of estimation processed by the intensity adjustment unit 114 in the specific region(s) pixel by pixel. More specifically, the inference-specific degradation restoration unit 115 inputs the input image data 116 and the processed degradation estimation result 302 into a second CNN 305. The inference-specific degradation restoration unit 115 then repeats the convolution calculation and the nonlinear calculation using the filters expressed by Eqs. (1) and (2) a plurality of times, and outputs the restored output image data 118.

Next, the processing by the second CNN 305 will be described with reference to FIGS. 3A and 4B.

As illustrated in FIG. 4B, the second CNN 305 includes a plurality of filters 401 and a connection layer 402. The inference-specific degradation restoration unit 115 initially inputs the input image data 116 and the processed degradation estimation result 302 connected or added to each other in the channel direction into the second CNN 305. The inference-specific degradation restoration unit 115 then applies filters 401 to the input data in succession to calculate a feature map. The inference-specific degradation restoration unit 115 then connects the feature map and the input data in the channel direction using the connection layer 402. The inference-specific degradation restoration unit 115 further applies filters 401 to the connected result in succession, and outputs the output image data 118 having the same number of channels as that of the input image data 116 from the last filter 401.

Next, the functional units of the cloud server 200 will be described.

The degradation addition unit 211 generates student image data by adding at least one or more types of degradation elements to teacher image data taken out of a degradation-free teacher image group. In the present exemplary embodiment, noise is described as an example of the degradation elements. The degradation addition unit 211 therefore generates student image data by adding noise as a degradation element to the teacher image data. In the present exemplary embodiment, the degradation addition unit 211 analyzes the physical properties of the imaging apparatus 10, and generates student image data by adding noise corresponding to a wider range of amounts of degradation than that of possible amounts of degradation occurring in the imaging apparatus 10 as a degradation element to the teacher image data. The reason why a wider range of amounts of degradation than in the analysis result are added is to provide margins for improved robustness since the range of amounts of degradation can vary due to individual differences of imaging apparatuses 10. More specifically, as illustrated in FIG. 5, the degradation addition unit 211 generates student image data 504 by adding 502 noise based on an analysis result 218 of the physical properties of the imaging apparatus 10 as a degradation element to teacher image data 501 taken out of a teacher image group 217. The degradation addition unit 211 then pairs the teacher image data 501 with the student image data 504 to generate training data. The degradation addition unit 211 generates a student image group including a plurality of pieces of student image data by adding a degradation element to each piece of teacher image data 501 in the teacher image group 217, whereby training data 505 is generated. While the present exemplary embodiment deals with noise as an example, the degradation addition unit 211 may add any one or a combination of two or more of a plurality of types of degradation elements to the teacher image data 501. As described above, examples of the degradation elements include blur, aberration, compression, low resolution, missing data, and a drop in contrast due to the weather in imaging.

The teacher image group 217 includes various types of image data. Examples include nature photographs including landscape photographs and animal pictures, portrait photographs such as studio portraits and sport pictures, and artificial pictures such as building and product pictures. In the present exemplary embodiment, like the input image data 116, the teacher image data 501 is raw image data where each pixel has a pixel value corresponding to the R, G, or B color. The analysis result 218 of the physical properties of the imaging apparatus 10 includes, for example, the amount of noise occurring from the built-in image sensor of the camera (imaging apparatus) 10 at each sensitivity, and the amount of aberration caused by a lens. Using the analysis result 218, how much degradation in image quality occurs can be estimated with respect to each imaging condition. In other words, by adding degradation estimated under an imaging condition to the teacher image data 501, an image similar to one obtained in imaging can be generated.

The training unit 212 obtains network parameters 219 to be applied to the CNNs for degradation restoration training, initializes the weights of the CNNs using the network parameters 219, and performs degradation restoration training using the training data 505 generated by the degradation addition unit 211. The network parameters 219 include the initial values of parameters of the CNNs, and hyper parameters indicating the structures of and optimization methods for the CNNs. The degradation restoration training in the training unit 212 is performed by the training-specific degradation estimation unit 213, the training-specific degradation restoration unit 214, the error calculation unit 215, and the model update unit 216.

FIG. 3B is a diagram illustrating a processing procedure for the training unit 212.

The training-specific degradation estimation unit 213 receives training data 306 from the degradation addition unit 211 and estimates the amount of degradation added 307 to student image data 308. Specifically, the training-specific degradation estimation unit 213 initially inputs the student image data 308 into a first CNN 301 to repeat the convolution calculation and the nonlinear calculation using the filters expressed by Eqs. (1) and (2) a plurality of times, and outputs a degradation estimation result 310.

The error calculation unit 215 inputs the amount of degradation added 307 and the degradation estimation result 310 to first loss processing 311 that is loss function calculation, and calculates an error therebetween. Here, the amount of degradation added 307, the student image data 308, and the degradation estimation result 310 all have the same number of pixels. Next, the model update unit 216 inputs the error calculated by the error calculation unit 215 into first update processing 312, and updates the network parameters of the first CNN 301 to reduce (minimize) the error.

The training-specific degradation restoration unit 214 receives the student image data 308 and the degradation estimation result 310 estimated by the training-specific degradation estimation unit 213, and performs restoration processing on the student image data 308. Specifically, the training-specific degradation restoration unit 214 initially inputs the student image data 308 and the degradation estimation result 310 into a second CNN 305 to repeat the convolution calculation and the nonlinear calculation using the filters expressed by Eqs. (1) and (2) a plurality of times, and outputs a restoration result 313.

The error calculation unit 215 then inputs the teacher image data 309 and the restoration result 313 into second loss processing 314 to calculate an error therebetween. Here, the teacher image data 309 and the restoration result 313 have the same number of pixels. The model update unit 216 then inputs the error calculated by the error calculation unit 215 into second update processing 315, and updates the network parameters of the second CNN 305 to reduce (minimize) the error. The training-specific degradation estimation unit 213 and the training-specific degradation restoration unit 214 calculate the errors at different timing, but the network parameters are updated at the same timing. The first CNN 301 and the second CNN 305 used by the training unit 212 are the same neural networks as the first CNN 301 and the second CNN 305 used by the inference unit 112, respectively.

<Processing Procedure for Entire Information Processing System>

Next, various types of processing performed by the information processing system according to the present exemplary embodiment will be described with reference to FIGS. 6A and 6B. FIGS. 6A and 6B are flowcharts illustrating a processing procedure for the information processing system according to the present exemplary embodiment. The functional units illustrated in FIG. 2 are implemented by the CPUs 101 and 201 running information processing computer programs according to the present exemplary embodiment. All or some of the functional units illustrated in FIG. 2 may be implemented by hardware. A description will now be given with reference to the flowcharts of FIGS. 6A and 6B.

An example of the procedure of the degradation restoration training performed by the cloud server 200 will initially be described with reference to the flowchart of FIG. 6A.

In step S601, the teacher image group 217 prepared in advance and the analysis result 218 of the physical properties of the imaging apparatus 10, such as the properties of the image sensor, imaging sensitivity, an object distance, the focal length of the lens, an f-number, and an exposure value, are input to the cloud server 200. Teacher image data is a raw image in the Bayer arrangement, and can be obtained by the imaging apparatus 10 capturing an image, for example. This is not restrictive. An image captured by the imaging apparatus 10 can be directly uploaded to the cloud server 200. Images captured in advance may be stored in an HDD and subsequently uploaded to the cloud server 200. The data on the teacher image group 217 and the analysis result 218 of the physical properties of the imaging apparatus 10 input to the cloud server 200 are delivered to the degradation addition unit 211.

In step S602, the degradation addition unit 211 generates student image data by adding noise based on the analysis result 218 of the physical properties of the imaging apparatus 10 to the teacher image data in the teacher image group 217 input in step S601. Here, the degradation addition unit 211 adds the amounts of noise previously measured based on the analysis result 218 of the physical properties of the imaging apparatus 10 in preset order or random order.

In step S603, the network parameters to be applied to the CNNs for the degradation restoration training are input to the cloud server 200. As described above, the network parameters here include the initial values of the parameters of the CNNs, and the hyper parameters indicating the structures of and optimization methods for the CNNs. The input network parameters are delivered to the training unit 212. The training unit 212 initializes the weights of the first and second CNNs 301 and 305 using the received network parameters.

In step S604, the training-specific degradation estimation unit 213 estimates degradation of student image data generated in step S602. The training-specific degradation restoration unit 214 then restores the student image data based on the estimation result.

In step S605, the error calculation unit 215 calculates an error between the restoration result and the teacher image data based on the loss function expressed by Eq. (3).

In step S606, the model update unit 216 updates the network parameters to reduce (minimize) the error obtained in step S605 as described above.

In step S607, the training unit 212 determines whether to end the training. For example, the training unit 212 can determine to end the training if the number of updates of the network parameters has reached a predetermined number. If the training unit 212 determines to not end the training (NO in step S607), the processing returns to step S604. In the processing of step S604 and the subsequent steps, the cloud server 200 performs training using another pair of student image data and teacher image data.

Next, an example of the procedure of the degradation restoration inference performed by the edge device 100 will be described with reference to the flowchart of FIG. 6B.

In step S608, the trained model 220 trained by the cloud server 200 and the input image data 116 that is a Bayer-arrangement raw image to perform the degradation restoration processing on are input to the edge device 100. For example, an image captured by the imaging apparatus 10 may be directly input as the raw image. An image captured in advance and stored in the mass storage device 104 may be read. The input image data 116 is delivered to the specific region extraction unit 111 and the inference unit 112. The trained model 220 is delivered to the inference unit 112.

In step S609, the specific region extraction unit 111 extracts a specific region or regions from the input image data 116. The extraction result is delivered to the intensity adjustment unit 114 as the specific region map 303.

In step S610, the inference-specific degradation estimation unit 113 constructs the same first CNN 301 as that used in the training by the training unit 212, and estimates degradation of the input image data 116. Here, the existing network parameters are initialized with the updated network parameters received from the cloud server 200. The inference-specific degradation estimation unit 113 thus inputs the input image data 116 into the first CNN 301 to which the updated network parameters are applied, and performs degradation estimation to obtain a degradation estimation result 302 by the same method as that performed by the training unit 212.

In step S611, the intensity adjustment unit 114 adjusts the amount of degradation restoration from the degradation estimation result 310 output in step S610, using the specific region map 303 output in step S609.

In step S612, the inference-specific degradation restoration unit 115 constructs the same second CNN 305 as that used in the training by the training unit 212, and performs degradation restoration on the input image data 116 using the degradation estimation result adjusted in step S611. More specifically, like step S610, the inference-specific degradation restoration unit 115 initializes the existing network parameters with the updated network parameters received from the cloud server 200, and performs degradation restoration on the input image data 116 by the same method as that performed by the training unit 212. The image data degradation-restored by the inference-specific degradation restoration unit 115 is then output as the output image data 118.

The entire processing procedure performed by the information processing system according to the present exemplary embodiment has been described above. Image degradation in the input image data 116 can thus be estimated and the intensity of restoration can be adjusted in each region of the input image based on the estimation result without changing the neural network configuration of the inference unit 112.

In the present exemplary embodiment, the training data 306 is generated in step S602. However, the training data 306 may subsequently be generated. Specifically, the cloud server 200 may be configured to generate student image data corresponding to teacher image data in the subsequent degradation restoration training.

In the present exemplary embodiment, training is performed from scratch using the data on the teacher image group 217 prepared in advance. However, the processing of the present exemplary embodiment may be performed based on trained network parameters.

The present exemplary embodiment has been described in conjunction with raw images captured using a color filter in the Bayer arrangement. However, other color filter arrangements may be employed. The image data format is not limited to raw images, either. For example, demosaiced RGB images or YUV-converted images may be used.

The present exemplary embodiment has been described by using noise as an example of the degradation element. However, the degradation element is not limited thereto. As described above, degradation elements can include any one or a combination of the following: blur, aberration, compression, low resolution, missing data, and a drop in contrast due to the effect of fog, mist, snow, or rain in imaging.

In the present exemplary embodiment, the inference unit 112 is described to output the output image data 118 alone obtained by the restoration processing on the input image data 116. However, the degradation estimation result 302 output by the inference-specific degradation estimation unit 113 may be output along with the output image data 118.

In the present exemplary embodiment, the edge device 100 is described to perform the degradation restoration based on the input image data 116 alone, using the trained model 220. However, parameters for assisting degradation restoration may also be used. For example, a lookup table including estimations about the degree of degradation to occur in image quality depending on imaging conditions such as the distance to an object, a focal length, a sensor size, and exposure may be stored in advance, and the amount of restoration may be adjusted by referring to the lookup table in degradation restoration. In other words, the inference unit 112 of the edge device 100 may adjust the intensity of degradation restoration based on the imaging conditions under which the image of the input image data 116 is captured.

The present exemplary embodiment has been described by using a case with there is a single piece of input image data 116 as an example. However, sequential image data such as frames of moving image data can also be processed. In such a case, continuous teacher image data in a time series and student image data generated by adding degradation thereto are used as the training image in the degradation restoration training. In performing degradation restoration on the sequential pieces of input image data, the same number of degradation estimation results are output. Here, the edge device 100 determines differences between the degradation estimation results, and sets the amount of noise reduction to be greater in regions of larger difference values to reduce ghosts and smoothen motion, since regions of large difference values can include a moving object, camerawork-based motion, or camera shake.

A second exemplary embodiment will be described. The first exemplary embodiment has dealt with an example where one type of degradation element (in the foregoing example, noise) is estimated from the input image data 116 and the amount of restoration is adjusted region by region based on the estimation result.

In the second exemplary embodiment, a method for estimating a plurality of degradation elements with respective priority levels from input image data, and performing restoration processing based on the estimated result and degradation estimation priority levels indicating the priority levels will be described. The description of a basic configuration of the information processing system common with that described in the first exemplary embodiment will be omitted, and differences will mainly be described below.

Figure 7:
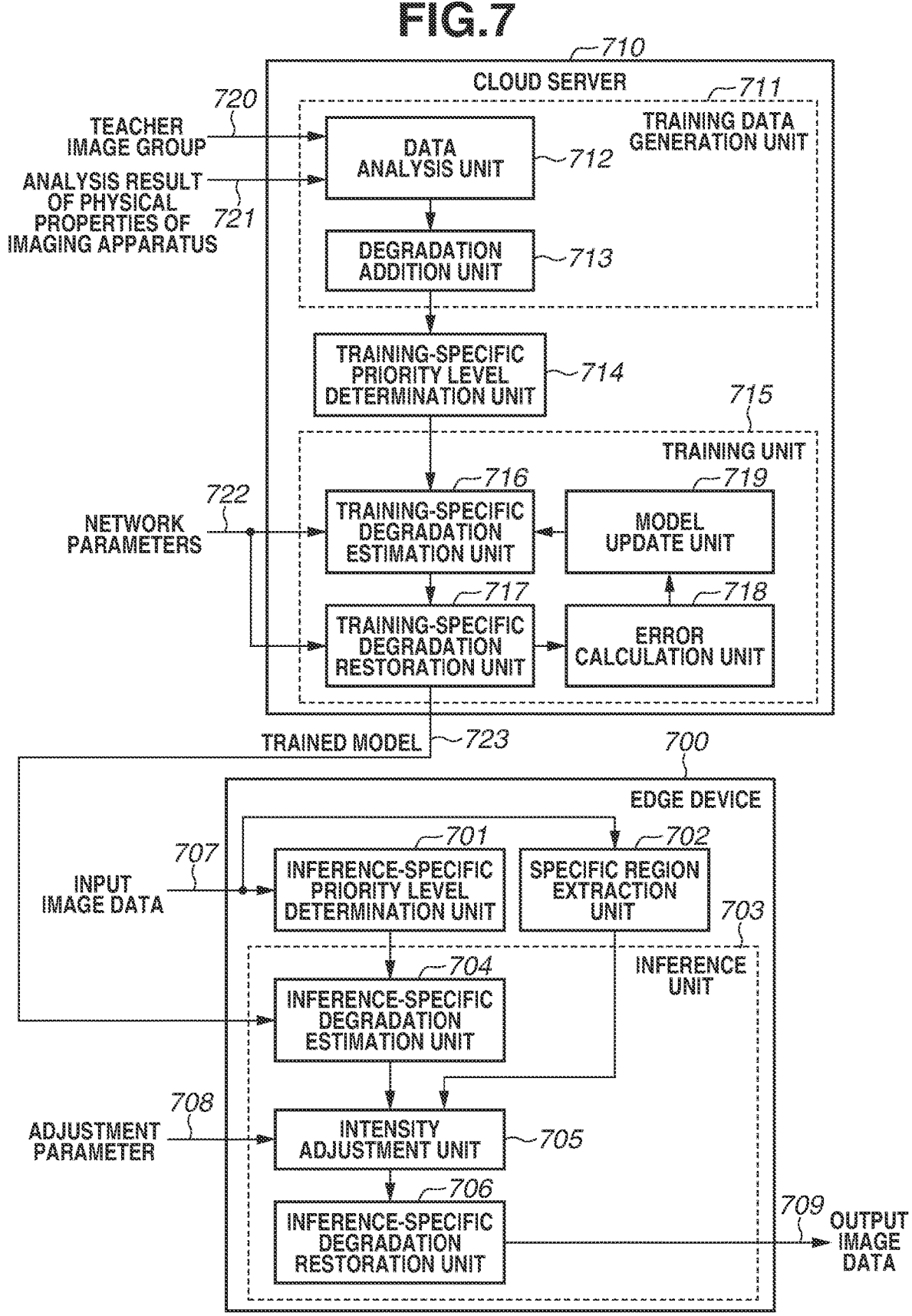
FIG. 7 is a diagram illustrating a functional configuration of an entire information processing system according to one or more aspects of the present disclosure.

FIG. 7 is a block diagram illustrating a functional configuration of the entire information processing system according to the second exemplary embodiment.

As illustrated in FIG. 7, an edge device 700 according to the second exemplary embodiment includes an inference-specific priority level determination unit 701, a specific region extraction unit 702, and an inference unit 703. The inference unit 703 includes an inference-specific degradation estimation unit 704, an intensity adjustment unit 705, and an inference-specific degradation restoration unit 706.

A cloud server 710 according to the second exemplary embodiment includes a training data generation unit 711, a training-specific priority level determination unit 714, and a training unit 715. The training data generation unit 711 includes a data analysis unit 712 and a degradation addition unit 713. The training unit 715 includes a training-specific degradation estimation unit 716, a training-specific degradation restoration unit 717, an error calculation unit 718, and a model update unit 719.

The functional units of the edge device 700 will initially be described.

The inference-specific priority level determination unit 701 determines the order in which a plurality of degradation elements included in input image data 707 and the intensities thereof are estimated, i.e., priority levels for inference.

It is suitable that the order of estimation is determined in that reverse order to that of the process of conversion from photons into pixel values. The process will now be briefly described. Photons flying from an object pass through a lens, an optical low-pass filter, and a color filter in order and reach photodiodes. The photodiodes convert the photons into electric charges, which are converted into voltages by capacitors, amplified by amplifiers, and then converted into pixel values by analog-to-digital (A/D) conversion circuits. Blur and aberration to occur before the photons reach the photodiodes can be optically analyzed. As for noise to occur after the arrival at the photodiodes and before the conversion into the pixel values, analysis of the sensor allows reproduction of how much image quality degradation occurs in the captured image. Image quality degradation such as a drop in contrast due to the weather like fog, mist, rain, and snow can also be analyzed since such degradation occurs when the photons pass through the lens. After the conversion of the photons into the pixel values, image quality is also degraded due to demosaicing processing for generating RGB values from a raw image in converting the raw image into a color image, color thinning processing from an RGB color space into a YUV color space, and bit compression. Such factors can also be analyzed if the image processing method and the compression method are known. The inference-specific priority level determination unit 701 determines the order in which the plurality of degradation elements included in the input image data 707 and the intensities thereof are estimated, i.e., the estimation priority levels based on the analysis results.

The specific region extraction unit 702 extracts a specific region or regions by processing similarly to that by the specific region extraction unit 111 according to the first exemplary embodiment.

The inference unit 703 estimates the plurality of degradation elements included in the input image data 707 based on the estimation priority levels determined by the inference-specific priority level determination unit 701, and performs degradation restoration inference based on the estimation results, using a trained model 723 received from the cloud server 710. The degradation restoration inference is performed by the inference-specific degradation estimation unit 704, the intensity adjustment unit 705, and the inference-specific degradation restoration unit 706.

The inference-specific degradation estimation unit 704 obtains the input image data 707 and the estimation priority levels from the inference-specific priority level determination unit 701, and estimates the plurality of degradation elements included in the input image data 707 and the amounts of degradation thereof based on the priority levels, using the trained model 723. As many degradation estimation results as the number of degradation elements to be estimated are thereby obtained. The amounts of degradation are obtained in the form of a pixel-by-pixel degradation amount map.

The intensity adjustment unit 705 processes the degradation estimation results estimated by the inference-specific degradation estimation unit 704 using the specific region map generated by the specific region extraction unit 702. The processing of the degradation estimation results is similar to that in the first exemplary embodiment, whereas the intensity adjustment unit 705 according to the second exemplary embodiment can adjust the intensity with respect to each degradation element. For example, if there are degradation estimation results of noise, blur, and aberration, the intensity adjustment unit 705 adjusts the amounts of degradation estimation by multiplying the degradation amount maps by a coefficient $\alpha$ 708 pixel by pixel. In the case of performing noise reduction alone on the specific region(s), the intensity adjustment unit 705 activates the degradation amount map about noise alone. Here, all the pixel values in the degradation amount maps about blur and aberration are set to 0 as if there were no degradation.

The inference-specific degradation restoration unit 706 receives the degradation estimation results processed by the intensity adjustment unit 705, and outputs the result of restoration made of the degradation of the input image data 707 based on the priority levels as an output image data 709.

Next, the functional units of the cloud server 710 according to the second exemplary embodiment will be described.

The data analysis unit 712 analyzes features of teacher image data taken out of a teacher image group 720. Specifically, the data analysis unit 712 extracts high frequency components using a spatial filter, and calculates the proportion of the high frequency components as a feature value. The data analysis unit 712 also make a setting to add a plurality of types of degradation elements such as noise, blur, and aberration, and the amounts of degradation thereof to teacher image data having a higher feature value, i.e., including a higher proportion of high frequency components by priority. The feature analysis technique is not limited thereto. The data analysis unit 712 may make a setting to add the plurality of types of degradation elements and the amounts of degradation thereof to teacher image data including a specific object by priority.

The degradation addition unit 713 performs processing similar to that by the degradation addition unit 211 according to the first exemplary embodiment as many times as the number of degradation elements to be added.

The training-specific priority level determination unit 714 determines the order in which the plurality of degradation elements added to the student image data and the intensities thereof are estimated, i.e., training-specific priority levels. The order of estimation is determined by processing similar to that by the inference-specific priority level determination unit 701.

The training unit 715 obtains network parameters 722 to be applied to the CNNs for the degradation restoration training. The training unit 715 initializes the weights of the CNNs with the network parameters 722, and performs degradation restoration training using the training data generated by the degradation addition unit 713. The network parameters 722 include the initial values of the parameters of the CNNs, and hyper parameters indicating the structures of and optimization methods for the CNNs. The degradation restoration training of the training unit 715 is performed by the training-specific degradation estimation unit 716, the training-specific degradation restoration unit 717, the error calculation unit 718, and the model update unit 719.

The training-specific degradation estimation unit 716 receives the training data from the training data generation unit 711, and estimates the plurality of degradation elements included in the student image data based on the priority levels determined by the training-specific priority level determination unit 714.

The training-specific degradation restoration unit 717 receives the student image data and the degradation estimation results estimated by the training-specific degradation estimation unit 716, and performs degradation restoration processing corresponding to the plurality of degradation elements included in the student image data.

The error calculation unit 718 has the same function as that of the error calculation unit 215 according to the first exemplary embodiment. The model update unit 719 has the same function as that of the model update unit 216 according to the first exemplary embodiment.

As described above, a difference of the second exemplary embodiment from the first exemplary embodiment is that a plurality of degradation elements is estimated based on the priority levels determined by the training-specific priority level determination unit 714, and degradation restoration processing is performed based on the estimation results.

<Processing Procedure for Entire Information Processing System>

Figure 8A:
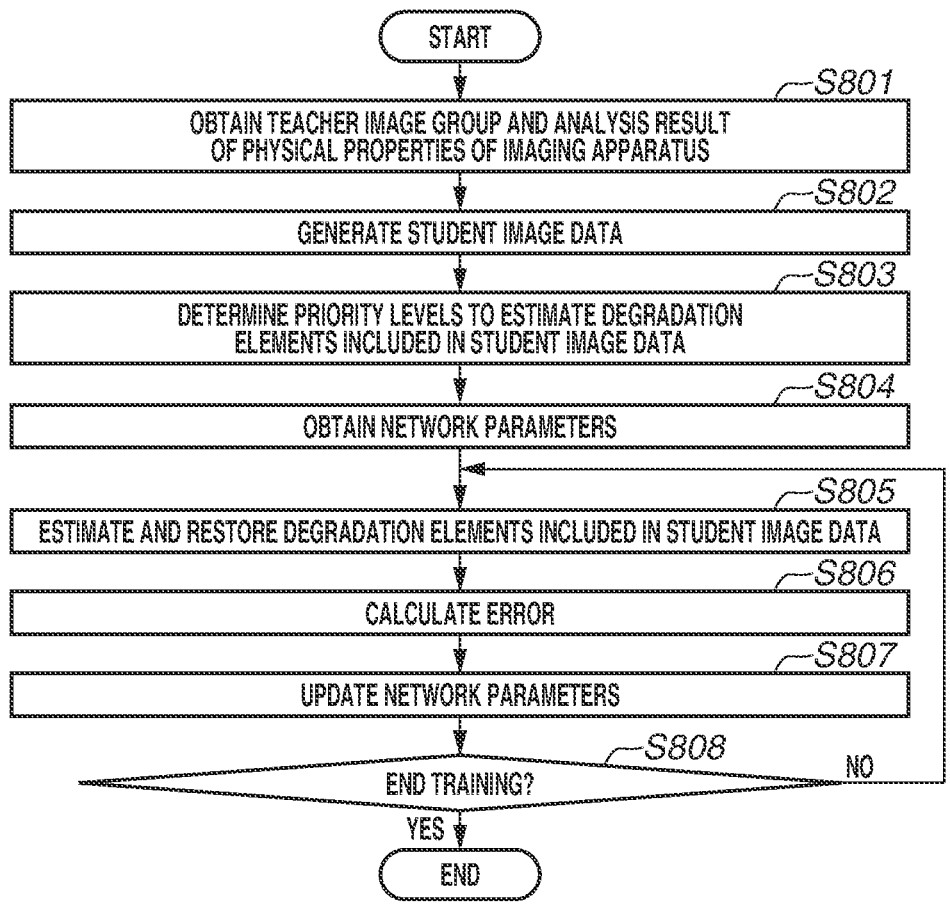
FIGS. 8A and 8B are flowcharts illustrating an information processing procedure according to one or more aspects of the present disclosure.
Figure 8B:
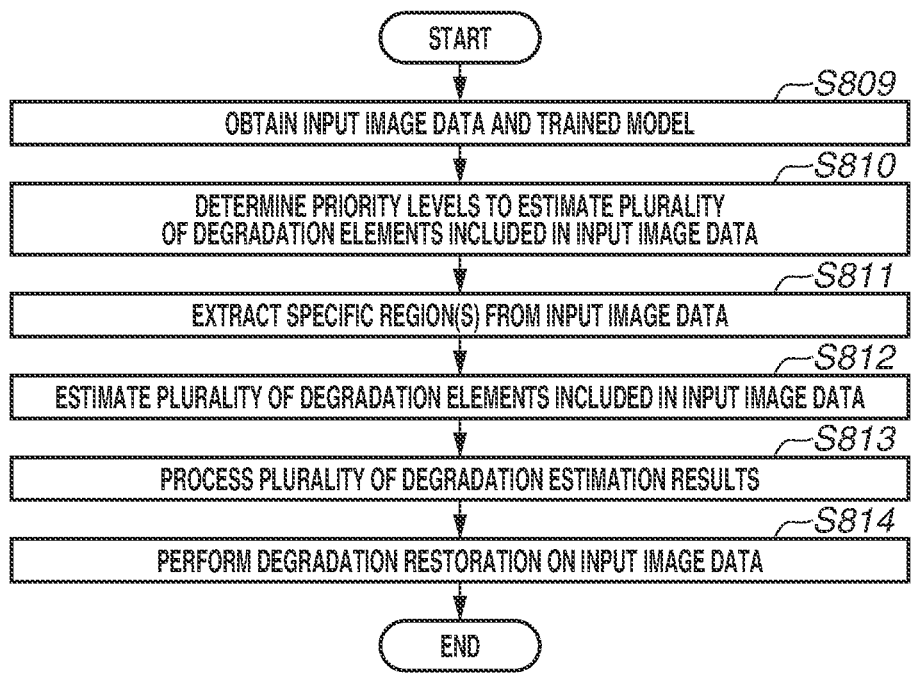

Next, various types of processing performed by the information processing system according to the second exemplary embodiment will be described with reference to FIGS. 8A and 8B. FIGS. 8A and 8B are flowcharts illustrating a processing procedure for the information processing system according to the second exemplary embodiment. The functional units illustrated in FIG. 7 are implemented by the CPU 101 or 201 running computer programs corresponding to the respective functional units. The processing procedure performed by the cloud server 710 according to the second exemplary embodiment will initially be described with reference to the flowchart of FIG. 8A.

In step S801, the teacher image group 720 prepared in advance and an analysis result 721 of the physical properties of the imaging apparatus 10 are input to the cloud server 710. The teacher image data and its uploading are similar to in the foregoing first exemplary embodiment. The data on the teacher image group 720 and the analysis result 721 of the physical properties of the imaging apparatus 10 input to the cloud server 710 are delivered to the data analysis unit 712.

In step S802, the data analysis unit 712 analyzes features of the teacher image data. For example, if, as a result of the analysis, a piece of teacher image data is found to include a lot of high frequency components, the degradation addition unit 713 adds degradation elements such as noise, blur, and aberration to the piece of teacher image data at various intensities. In such a manner, various pieces of student image data are generated.

In step S803, the training-specific priority level determination unit 714 determines the priority levels to estimate the degradation elements included in the student image data.

In step S804, the network parameters to be applied to the CNNs for the degradation restoration training are input to the cloud server 710. Like the first exemplary embodiment, the network parameters here include the initial values of the parameters of the CNNs and the hyper parameters indicating the structures of and optimization methods for the CNNs. The input network parameters are delivered to the training unit 715.

In step S805, the training-specific degradation estimation unit 716 estimates the plurality of degradation elements included in the student image data based on the priority levels. The training-specific degradation restoration unit 717 performs degradation restoration processing based on the estimation results.

In step S806, the error calculation unit 718 calculates an error between the restoration result and the teacher image data based on the loss function expressed by Eq. (3).

In step S807, the model update unit 719 updates the network parameters to reduce (minimize) the error obtained in step S806.

In step S808, the training unit 715 determines whether to end the training. Like the foregoing first exemplary embodiment, the training unit 715 can determine to end the training if the number of updates of the network parameters has reached a predetermined number. If the training unit 715 determines to not end the training (NO in step S808), the processing returns to step S805. In the processing of step S805 and the subsequent steps, the cloud server 710 performs training using another pair of student image data and teacher image data.

Next, the processing procedure performed by the edge device 700 according to the second exemplary embodiment will be described with reference to the flowchart of FIG. 8B.

In step S809, the trained model 723 trained by the cloud server 710 and the input image data 707 to perform the degradation restoration processing on are input to the edge device 700. Like the first exemplary embodiment, the input image data 707 is a raw image. The input image data 707 is delivered to the inference-specific priority level determination unit 701 and the specific region extraction unit 702. The trained model 723 is delivered to the inference unit 703.

In step S810, the inference-specific priority level determination unit 701 determines the priority levels to estimate a plurality of degradation elements included in the first image data 707.

In step S811, the specific region extraction unit 702 extracts a specific region or regions from the input image data 707. The extraction result is delivered to the intensity adjustment unit 705 as a specific region map.

In step S812, the inference-specific degradation estimation unit 704 estimates a plurality of degradation elements included in the input image data 707 based on the priority levels determined in step S810.

In step S813, the intensity adjustment unit 705 processes the plurality of degradation estimation results, i.e., adjusts the intensities of restoration.

In step S814, the inference-specific degradation restoration unit 706 performs the degradation restoration processing on the input image data 707 based on the degradation estimation results processed in step S813. The image data degradation-restored by the inference-specific degradation restoration unit 706 is output as the output image data 709.

The entire processing procedure performed by the information processing system according to the second exemplary embodiment has been described above. A plurality of image quality degradation elements in the input image data 707 can thus be estimated and the intensities of restoration can be adjusted region by region of the input image based on the estimation results without changing the neural network configuration of the inference unit 703.

In the present exemplary embodiment, the priority levels of the degradation elements to be estimated are determined by the training-specific priority level determination unit 714 in performing the degradation restoration training. However, the degradation addition unit 713 may add the degradation elements in the reverse order to that of estimation, and the training-specific priority level determination unit 714 may be skipped.

<Modifications>

The foregoing first and second exemplary embodiments have dealt with an example of extracting specific regions and adjusting the intensity of restoration region by region. However, the degradation restoration inference may be performed with the regions of the input image data other than the specific regions masked in advance. This can provide a result where degradation of the specific regions alone of the input image data is restored.

An exemplary embodiment of the present disclosure can also be implemented by processing for supplying a program for implementing one or more functions of the foregoing exemplary embodiments to a system or an apparatus via a network or a storage medium, and reading and running the program by one or more processors in a computer of the system or apparatus. A circuit for implementing one or more functions (such as an application specific integrated circuit [ASIC]) can also be used for implementation.

All the foregoing exemplary embodiments are just examples of embodiment in implementing the present disclosure, and the technical scope of the present disclosure should not be interpreted as limited to the foregoing exemplary embodiments.

In other words, exemplary embodiments of the present disclosure can be implemented in various forms without departing from the technical concept or essential features of the present disclosure.

According to the exemplary embodiments of the present disclosure, degradation can be reduced in each partial region of an image to be processed.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-156591, filed Sep. 27, 2021, which is hereby incorporated by reference herein in its entirety.

What is claimed is:

1. An information processing apparatus comprising:
one or more memories storing instructions; and
one or more processors executing the instructions to function as:
an identification unit configured to identify a partial region of an input image; and
a processing unit configured to perform image processing for reducing degradation of the input image on the input image by inference using a neural network,
wherein the processing unit is configured to change the image processing between the partial region and another region,
wherein the priority level is determined in reverse order to that of a process of conversion from a photon into a pixel value.

2. The information processing apparatus according to claim 1, wherein the identification unit is configured to identify a region of at least one or more objects in the input image as the partial region.

3. The information processing apparatus according to claim 1, wherein the identification unit is configured to identify a component within a specific frequency band in the input image as the partial region.

4. The information processing apparatus according to claim 1, wherein the identification unit is configured to identify a user-specified region in the input image as the partial region.

5. The information processing apparatus according to claim 1, wherein the processing unit is configured to perform the image processing for reducing the degradation on the partial region and another region of the input image separately, based on a result of estimation made of the degradation of the input image by the inference using the neural network.

6. The information processing apparatus according to claim 5, wherein the processing unit is configured to control an amount of reduction in the degradation by the image processing in the partial region and another region separately.

7. The information processing apparatus according to claim 6, wherein the amount of reduction in the degradation is an amount by which an intensity of reduction in the degradation is adjusted in the partial region and another region separately.

8. The information processing apparatus according to claim 6, wherein the processing unit is configured to control the amount of reduction in the degradation by performing processing to adjust an amount of estimation pixel by pixel, the amount of estimation being a result of estimation made of the degradation in each region.

9. The information processing apparatus according to claim 6, wherein the processing unit is configured to control the amount of reduction in the degradation based on an imaging condition under which the input image is captured.

10. The information processing apparatus according to claim 1, wherein the processing unit is configured to output an image obtained by performing the image processing for reducing the degradation of the input image.

11. The information processing apparatus according to claim 1, wherein the processing unit is configured to determine a priority level to estimate the degradation from the input image, and estimate a degradation element of the input image based on the priority level.

12. The information processing apparatus according to claim 1, further comprising:
an addition unit configured to add at least one or more types of degradation elements to a teacher image to generate a student image; and
a training unit configured to train a neural network based on the teacher image and the student image,
wherein the training unit is configured to perform image processing for reducing degradation of the student image based on a result of estimation made of the degradation of the student image using the teacher image and the student image, and train the neural network using the student image of which the degradation is reduced by the image processing and the teacher image.

13. The information processing apparatus according to claim 12, wherein the addition unit is configured to add a wider range of amounts of degradation than amounts of degradation to occur in an imaging apparatus based on an analysis result of a physical property of the imaging apparatus.

14. The information processing apparatus according to claim 12, wherein the training unit is configured to estimate an intensity of the degradation from a second image, and train the neural network to minimize an error between a result of estimation of the intensity of the degradation and the intensity of an added degradation element.

15. The information processing apparatus according to claim 12, wherein the training unit is configured to output an image obtained by performing the imaging processing based on a second image and the result of the estimation made of the degradation, and train the neural network to minimize an error between the image obtained by performing the image processing and a first image.

16. The information processing apparatus according to claim 1, wherein the neural network includes a degradation estimation network that estimates the degradation and a degradation restoration network that performs imaging processing for reducing the degradation.

17. The information processing apparatus according to claim 1, wherein the degradation includes one or more of the following: noise, compression, low resolution, blur, aberration, missing data, and a drop in contrast due to weather in imaging.

18. An information processing apparatus comprising:
one or more memories storing instructions; and
one or more processors executing the instructions to function as:
an addition unit configured to add a plurality of types of degradation elements to a first image to generate a second image; and
a training unit configured to train a neural network based on the first image and the second image,
wherein the training unit is configured to perform image processing for reducing degradation of the second image based on a result of estimation made of the degradation of the second image using the first image and the second image, and train the neural network using the second image of which the degradation is reduced by the image processing and the first image,
wherein the addition unit is configured to add the plurality of types of degradation elements by priority, the first image including a predetermined high frequency component.

19. The information processing apparatus according to claim 18, wherein the training unit is configured to determine a priority level to estimate the degradation from the second image, and estimate a degradation element of the second image based on the priority level.

20. An information processing method comprising:
identifying a partial region of an input image; and
performing image processing for reducing degradation of the input image on the input image by inference using a neural network,
wherein the image processing is changed between the partial region and another region,
wherein the priority level is determined in reverse order to that of a process of conversion from a photon into a pixel value.

21. An information processing method comprising:
adding a plurality of types of degradation elements to a first image to generate a second image; and
training a neural network based on the first image and the second image,
wherein image processing for reducing degradation of the second image is performed based on a result of estimation made of the degradation of the second image using the first image and the second image, and the neural network is trained using the second image of which the degradation is reduced by the image processing and the first image,
wherein the addition unit is configured to add the plurality of types of degradation elements by priority, the first image including a predetermined high frequency component.

22. A non-transitory computer-readable storage medium storing instructions that, when executed by a computer, cause the computer to perform a method comprising:
adding a plurality of types of degradation elements to a first image to generate a second image; and
training a neural network based on the first image and the second image,
wherein, in the training, image processing for reducing degradation of the second image is performed based on a result of estimation made of the degradation of the second image using the first image and the second image, and the neural network is trained using the second image of which the degradation is reduced by the image processing and the first image,
wherein the addition unit is configured to add the plurality of types of degradation elements by priority, the first image including a predetermined high frequency component.

* * * * *